United States Patent [19]
Carter

[11] 3,845,434
[45] Oct. 29, 1974

[54] TENSION SENSING APPARATUS

[75] Inventor: James M. Carter, Minnetonka, Minn.

[73] Assignee: Control Data Corporation, Minneapolis, Minn.

[22] Filed: Oct. 31, 1973

[21] Appl. No.: 411,499

[52] U.S. Cl. .................. 336/30, 73/144, 336/136
[51] Int. Cl. ............................................ H01f 21/06
[58] Field of Search ........ 336/30, 136, 130; 73/159, 73/144, 143

[56] References Cited
UNITED STATES PATENTS
3,058,076  10/1962  Hasler et al. ........................ 336/30
FOREIGN PATENTS OR APPLICATIONS
946,342  1/1964  Great Britain .................... 73/144

Primary Examiner—Thomas J. Kozma
Attorney, Agent, or Firm—Robert M. Angus

[57] ABSTRACT

Apparatus for sensing the tension in a looped strip, is provided having a resilient member having a cavity. Fluid under pressure is admitted into said cavity, and apertures are disposed in said resilient member to admit fluid from said cavity into a region between the looped strip and the resilient member. The tension in the strip bears against the fluid in said region, and the resilient member is sufficiently resilient to deform in accordance with the tension on the strip. Sensor means is provided for sensing the deformation of the resilient means.

10 Claims, 3 Drawing Figures

PATENTED OCT 29 1974                                    3,845,434

TENSION SENSING APPARATUS

This invention relates to tension sensing devices, and particularly to devices for sensing the tension in a looped belt or strip.

In U.S. application Ser. No. 260,602, now U.S. Pat. No. 3,773,983, filed June 7, 1972 for "Lateral Strip Control Apparatus" by Dale Larson, now U.S. Pat. No. 3,733,983, and assigned to the same assignee as the present invention, there is described apparatus for transversely moving and positioning a segment of a flexible magnetizable strip to permit access to a specified one of a plurality of data tracks. In connection with the apparatus described in the aforementioned patent application, a magnetizable strip is moved from a payoff reel to a take-up reel past a drum. Apparatus is provided for sensing the lateral position of the strip to operate a controller to control the position of the strip as it passes the drum.

The present invention concerns apparatus for sensing the tension in a strip, and particularly for sensing and controlling the tension in a flexible magnetizable strip as it feeds through the apparatus described in the above-identified application.

In accordance with the present invention, a moveable strip is at least partially looped around a resilient member ported along its length with apertures of a predetermined size. The internal portion of the member is closed to form a cavity, and means is provided to introduce pressurized fluid into the cavity. The fluid escapes through the apertures to provide a fluid bearing between the external walls of the member and the looped strip. The member is sufficiently resilient so as to partially deform from its normal shape in accordance with the tension in the strip. Sensing apparatus is provided for detecting the deformation of the member to provide an output signal representative of the tension in the strip.

In accordance with one feature of the present invention, the fluid passed through the apertures along the length of the member provides a fluid bearing between the outside surface of the member and the strip looped about the member.

In accordance with another feature of the present invention, the sensing apparatus includes linearly variable differential transformer apparatus having a moveable iron core attached to an inner surface of the member so that upon deformation of the member, the transformer produces a signal representative of the relative deformation.

The above and other features of this invention will be more fully understood from the following detailed description and the accompanying drawings, in which.

Figure 1:
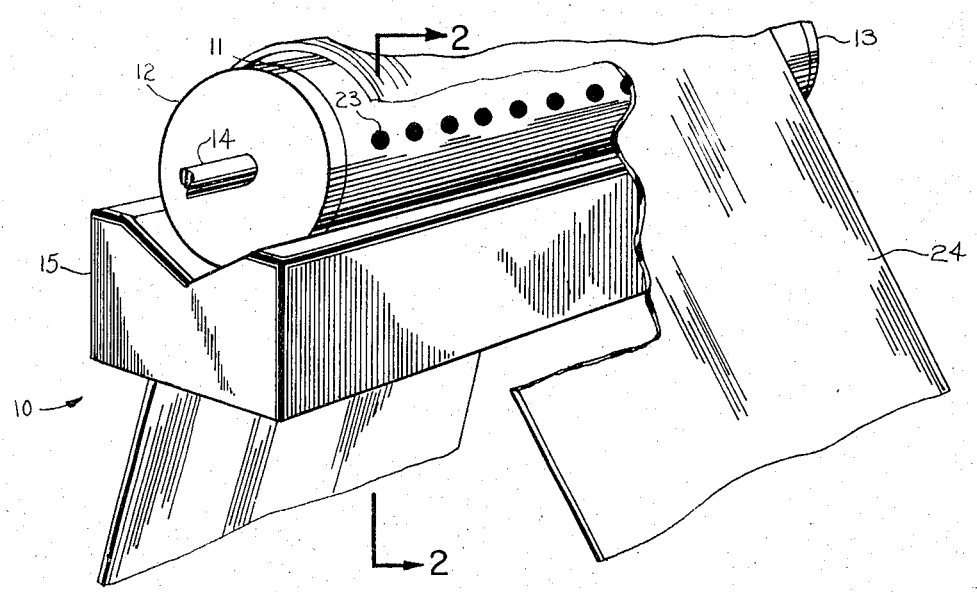
FIG. 1 is a perspective view of tension sensing apparatus in accordance with the presently preferred embodiment of the present invention.
Figure 2:
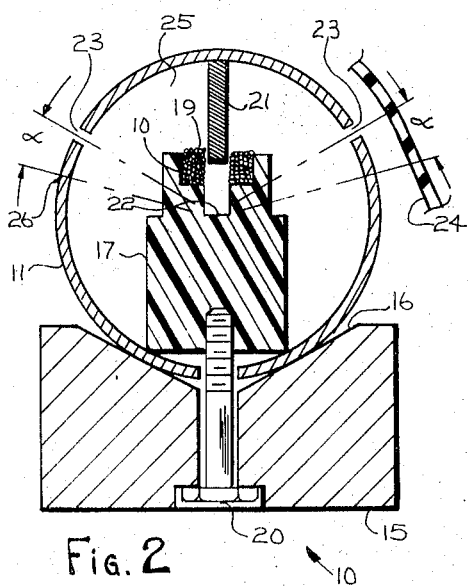
FIG. 2 is a section view taken along line 2—2 in FIG. 1.
Figure 3:
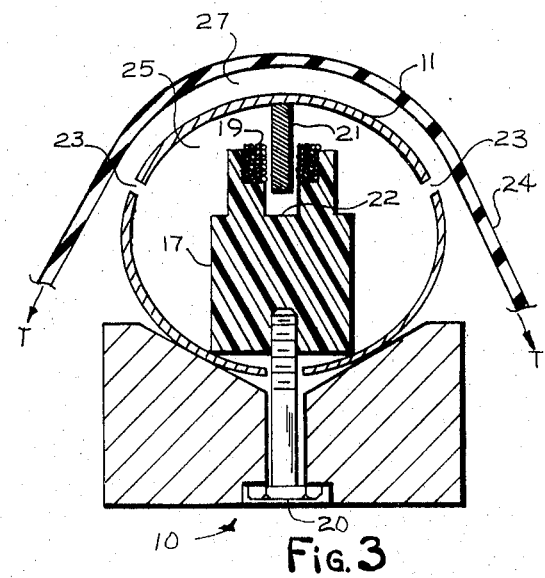
FIG. 3 is a section view as in FIG. 2 showing the sensing apparatus in a typical mode of operation.

Referring to the drawings, and particularly to FIG. 1, there is illustrated a sensor 10 in accordance with the presently preferred embodiment of the present invention. The sensor includes a substantially cylindrical tube 11 contructed of resilient material. For example, tube 11 may be constructed of suitable aluminum stock having a wall thickness of approximately 0.035 inches and an outside diameter of approximately 2 ¼ inches. Tube 11 is sealed at its ends by flexible caps 12 and 13, which may, for example, be constructed of a suitable deformable vinyl plastic. Preferably, a suitable conduit 14 introduces fluid under pressure to the interior cavity 25 of tube 11 through end cap 12. Tube 11 is nested in channel 16 of housing 15. Support 17 is centrally positioned within tube 11 and includes a first bore 18 which supports the coil winding 19 of a linearly variable differential transformer. Support 17 is fastened to housing 15 by fastener 20 to thereby sandwich a portion of tube 11 between support 17 and housing 15. Magnetic core 21, which may be constructed of iron, is fastened to the inner surface of an upper portion of tube 11 so as to protrude downwardly, as shown in FIGS. 2 and 3 into the region of transformer 19. Preferably, and as shown particularly in FIGS. 2 and 3, support 17 includes a counter-bore 22 to permit downward travel of core 21 upon deformation of tube 11.

Tube 11 includes two rows of a plurality of apertures 23 disposed along the length of the tube at angle $\alpha$ to the tangent of travel of strip 24. Preferably, angle $\alpha$ is approximately 5°, so apertures 23 are located approximately 5° inboard, or toward the axis of core 21 and coil 19, from the tangent 26 between the strip 24 and tube 11. Each aperture may have a diameter of approximately 0.030 inches, and may be disposed approximately 0.8 inches apart along the length of tube 11.

In operation of the apparatus, pressurized fluid, such as air under pressure, is introduced through conduit 14 to cavity 25 of tube 11. Preferably, the pressure of the fluid in tube 11 is approximately five pounds per square inch over atmospheric pressure for tensions in the vicinity of about two pounds per inch width of strip 24. Fluid in cavity 25 passes through ports 23 under pressure to form a fluid bearing in region 27 between the outside surface of tube 11 and strip 24.

Referring particularly to FIG. 3, a change in tension T on strip 24 causes a corresponding change in the force imposed on the fluid in region 27 by strip 24. The changed force is transmitted via the fluid in region 27 to change the force bearing against the upper surface of tube 11. Thus, if the tension on strip 24 increases, the increased force is transmitted through the air bearing in region 27 to increase the force on tube 11. Likewise, if the tension decreases, the force on tube 11 also decreases.

The size and spacing of apertures 23 is such that the pressure in region 27 is substantially independent of the pressure in cavity 25. For example, it has been found that for the sizes and dimensions herein set forth, the normal fluid pressure in region 27 is about 2 p.s.i.a., regardless of minor changes in the pressure in cavity 25. It is theorized that when the tension in strip 24 is altered, the altered force is transmitted through the fluid in region 27 to the outside surface of tube 11 between tangents 26. The natural bias force of the tube (the natural tendance for the tube to assume its cylindrical shape), together with the pressure in the tube supports the increased or decreased force, as the case may be.

The air bearing between the moving strip and the tube is a flowing air cushion (at least adjacent the moving strip). Consequently, the air bearing can be considered as a somewhat incompressible fluid. Therefore, as the tension on strip 24 changes, a corresponding change in force on the air bearing in region 27 caused by the change in tension on the strip is transferred through the air bearing to alter the force on tube 11.

From the foregoing it is evident that alteration in strip tension causes an alteration in the deformation of tube 11. Deformation of tube 11 is detected by transformer 19 which in turn produces an output signal representative of the deformation of tube 11, and hence the tension on strip 24.

The output signal from coil 19 may be coupled to the controller as described in the aforementioned patent application to selectively adjust the tension in strip 24.

The present invention is capable of accommodating tension in strip 24 between about 20 and 40 pounds. The apparatus is particularly suitable for magnetizable memory strips as described in the aforementioned application which move at a rate of approximately 500 inches per second and have a width of approximately 12 inches.

The present invention thus provides a tension sensing device for sensing the tension on a looped strip of the class which is moveable over a fluid bearing. The sensing apparatus is reliable in operation and rugged in use. The apparatus is light-weight and has a low mass. Hence, the sensor is rapid in its response to changing strip tension. Further, the air bearing between the sensor and the moving strip provides a substantially frictionless bearing between the sensor and the strip.

This invention is not to be limited by the embodiment shown in the drawings and described in the description, which is given by way of example and not of limitation, but only in accordance with the scope of the appended claims.

What is claimed is:

1. Sensing apparatus for sensing the tension of a strip, comprising, in combination: resilient means having a substantially rounded wall portion formed about an axis to form a cavity in said resilient means; fluid conduit means in fluid communication with said cavity, said strip being positioned outside of said resilient means and at least partially looped about said axis in spaced relation to said wall portion; fluid aperture means in said wall portion providing fluid communication between said cavity and the region between the looped portion of said strip and said wall portion, said wall portion being sufficiently resilient so as to deform when the force against the outside surface of said wall portion changes; and sensor means mounted to said resilient means for sensing the deformation of said wall portion, whereby upon change in tension in said strip a corresponding change occurs in the force imposed on fluid in said region by said strip to correspondingly change the force against the outside surface of said wall portion.

2. Apparatus according to claim 1, wherein said resilient means comprises a substantially cylindrical thin-walled tube, housing means fixedly supporting at least a portion of said tube, and resilient seal means closing the ends of said tube to form said cavity.

3. Apparatus according to claim 1, wherein said strip is a flexible, moving strip.

4. Apparatus according to claim 1, wherein said fluid aperture means comprises at least a first and a second row of a plurality of fluid apertures, said first and second rows each being disposed at approximately 5° toward the apex of said loop from the tangent between said looped portion of said strip and said resilient means, the fluid in said region forming a fluid bearing between said looped portion of said strip and said wall portion.

5. Apparatus according to claim 4, wherein said sensor includes coil means fixedly positioned within said resilient means, said coil means having an axis, and metal core means mounted to said wall portion and adapted to reciprocate within said coil along the axis of said coil in accordance with deformation of said wall portion.

6. Apparatus according to claim 5, wherein said coil is a linearly variable differential transformer and said core means is reciprocable within said transformer to alter an electric signal output from said transformer in accordance with the position of said core means.

7. Apparatus according to claim 6, wherein the axis of said coil is substantially perpendicular to the axis of said resilient means.

8. Apparatus according to claim 1, wherein said sensor includes coil means fixedly positioned within said resilient means, said coil means having an axis, and metal core means mounted to said wall portion and adapted to reciprocate within said coil along the axis of said coil in accordance with deformation of said wall portion.

9. Apparatus according to claim 8, wherein said coil is a linearly variable differential transformer and said core means is reciprocable within said transformer to alter an electric signal output from said transformer in accordance with the position of said core means.

10. Apparatus according to claim 9, wherein the axis of said coil is substantially perpendicular to the axis of said resilient means.

* * * * *